United States Patent [19]

Porter

[11] Patent Number: 5,438,800
[45] Date of Patent: Aug. 8, 1995

[54] STABILIZER FOR OUTSIDE SLIDING PLUG DOORS

[75] Inventor: Troy L. Porter, Roselle, Ill.

[73] Assignee: Mark IV Transportation Products Corp., Niles, Ill.

[21] Appl. No.: 226,140

[22] Filed: Apr. 11, 1994

[51] Int. Cl.⁶ .............................................. E05D 15/10
[52] U.S. Cl. ....................................................... 49/209
[58] Field of Search ................ 49/209, 210, 211, 216, 49/324, 360, 409, 410; 296/155

[56] References Cited

U.S. PATENT DOCUMENTS

| | | | |
|---|---|---|---|
| 4,000,582 | 1/1977 | Monot | 49/218 |
| 4,019,775 | 4/1977 | Grossbach et al. | 296/155 |
| 4,157,846 | 6/1979 | Whitcroft | 49/209 X |
| 4,869,544 | 9/1989 | Anwyll et al. | 49/209 X |
| 4,924,625 | 5/1990 | Dilcher | 49/212 |
| 5,140,770 | 8/1992 | Morvan | 49/215 |
| 5,142,823 | 9/1992 | Goldbach | 49/118 |
| 5,263,280 | 11/1993 | Dilcher | 49/212 |
| 5,271,181 | 12/1993 | Pietro | 49/118 |

FOREIGN PATENT DOCUMENTS 492743 7/1992 European Pat. Off. .

Primary Examiner—Peter M. Cuomo
Assistant Examiner—Jerry Roman
Attorney, Agent, or Firm—Francis J. Lidd

[57] ABSTRACT

A stabilizing arm for use in power operated doors in mass transit vehicles. Doors are of the type where a door panel is moved out of an opening in the car side wall to an opened position outside the car side wall. Stabilization is achieved by moving a rotating arm out of the side wall and capturing the panel in its opened position, thereby minimizing possible hazards in passenger passing through the car opening and damage to the doors either by passengers or others. Operation of the arm is sequenced in the door opening cycle.

5 Claims, 4 Drawing Sheets

U.S. Patent  Aug. 8, 1995  Sheet 1 of 4  5,438,800
Fig. 1
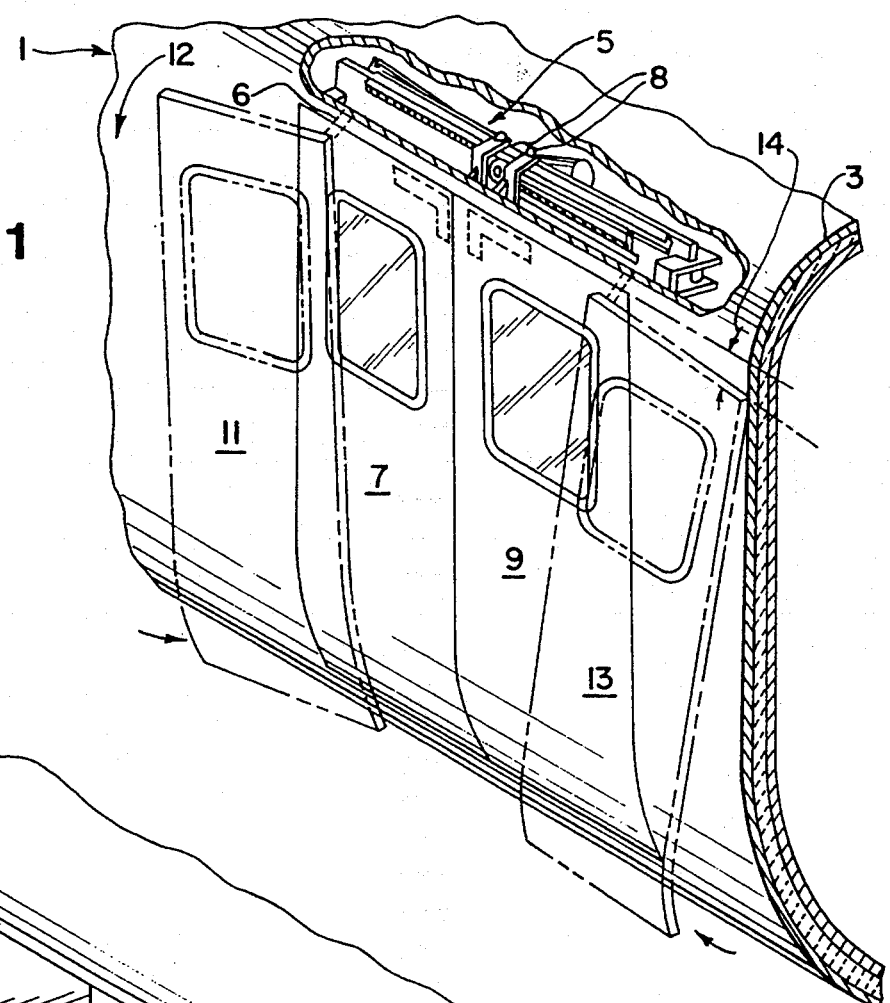
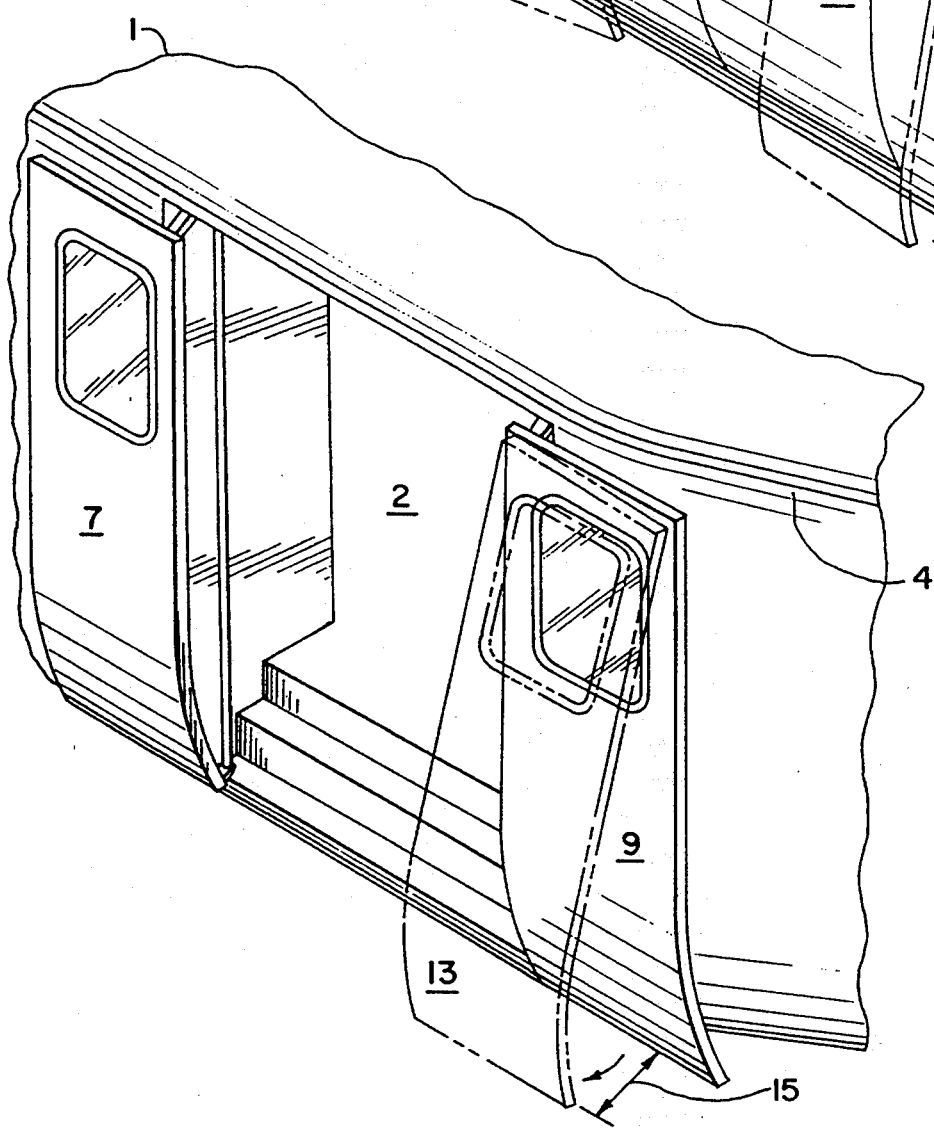
Fig. 2

Fig. 3
Fig. 4
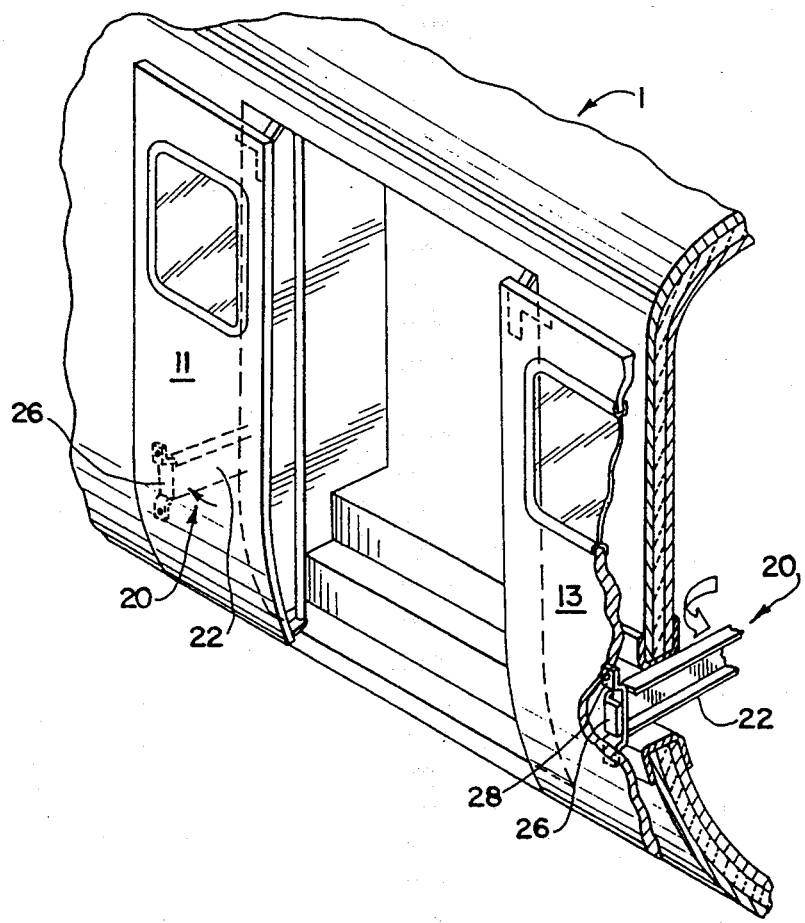
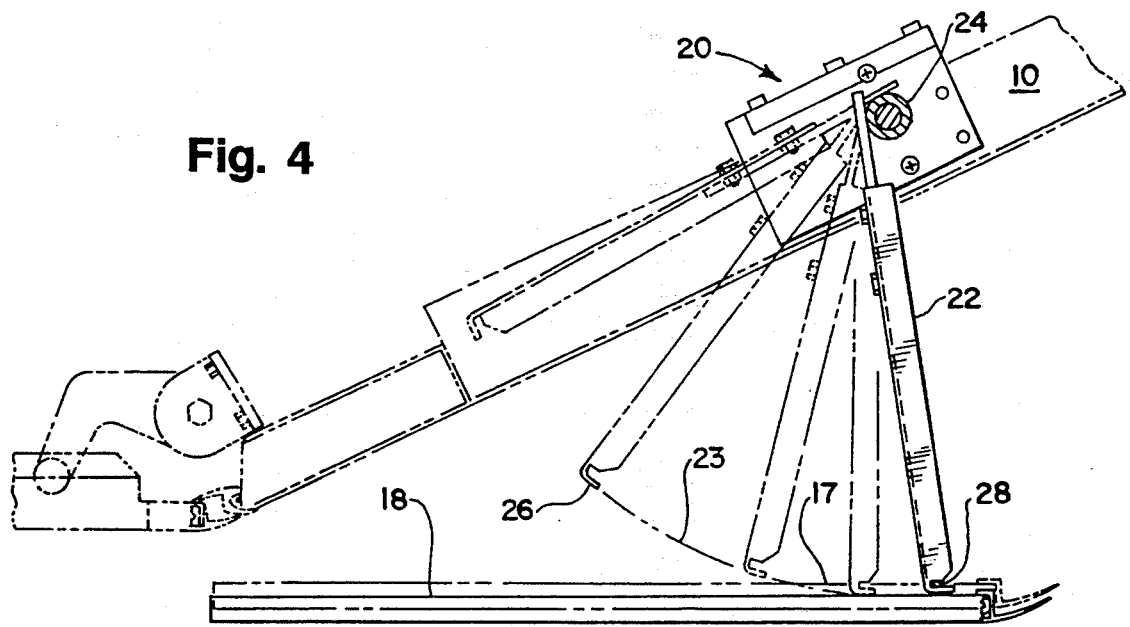

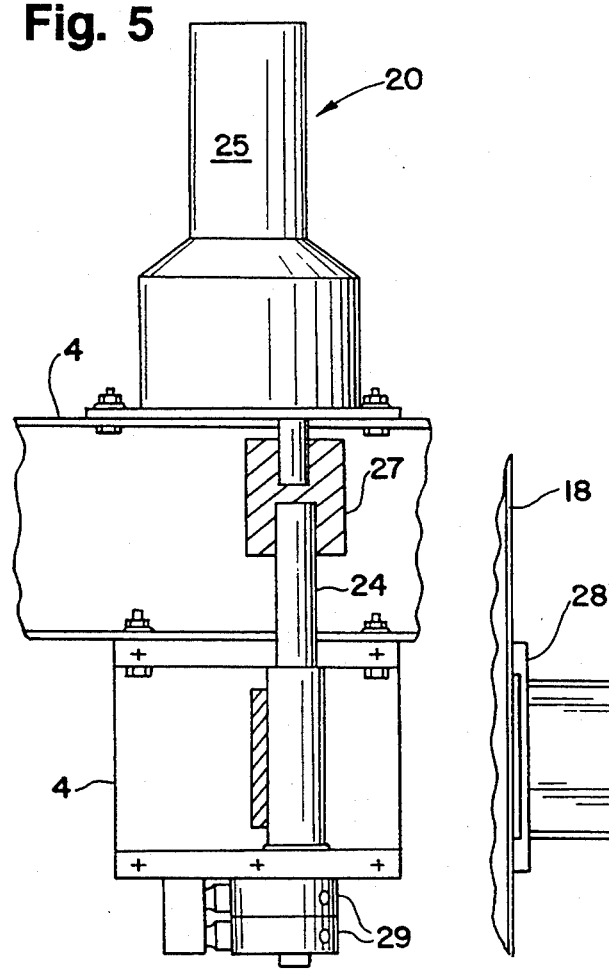
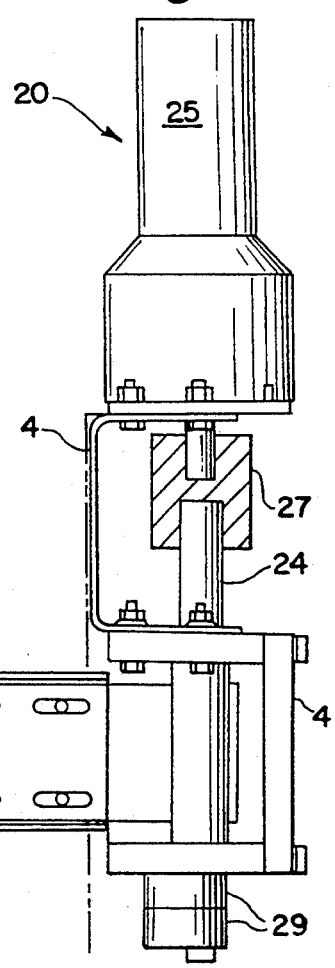
Fig. 5
Fig. 6
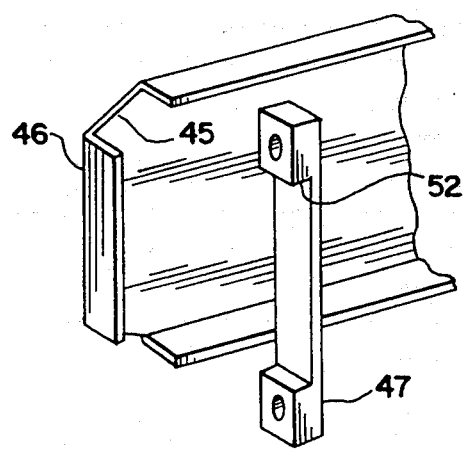
Fig. 7

STABILIZER FOR OUTSIDE SLIDING PLUG DOORS

CROSS-REFERENCE TO RELATED APPLICATIONS

This application pertains to co-pending application Ser. No. 08/164,120 for DOOR DRIVE EQUIPMENT FOR MASS TRANSIT VEHICLES, filed Dec. 7, 1993. The specification and drawings of said application are hereby incorporated by reference herein.

BACKGROUND OF THE INVENTION

This invention relates generally to power operated doors for passenger control in mass transit vehicles, of the type where the door panel essentially plugs and unplugs an opening in the car side wall in door opening and door closing operations.

Typically, systems of this type are disclosed and claimed in the above-mentioned co-pending application and other door systems disclosed and claimed in issued patents, including U.S. Pat. No. 5,263,280. While these systems operate successfully and many are in use today, a difficulty arises in that for the unplugged door opened position the door panel is located out of the opening and adjacent the vehicular side wall. Also, in order to insure that the passenger opening is not obstructed by the panel in its opened position, it is common practice to support the door panel by an attachment to the operator at or near its inside or passenger interfacing edge and along the panel upper edges. Under these conditions, the door panel is essentially cantilevered outward of the upper inside support, resulting in substantial strain on the operator and/or hanger utilized. This strain results in a certain amount of door sag or downward deflection from a horizontal position. An additional difficulty of the above-described support comes from the large leverage on the operator support for forces applied to the door panel lower edge.

Further, the elasticity of the cantilevered door support system allows a substantial amount of door oscillation when moving from closed to open, the door panel stops in the opened position alongside the car body. This oscillation motion is compound in that it has amplitude components, both perpendicular and parallel to the door panel.

Generally speaking, the resilient nature of the operator drive and large door panel to operator leverage characteristics of these systems is undesirable in that damage to or high wear rate on the operator can occur either from repeated normal operation, passenger contact with the door panel, or deliberate acts of vandalism, i.e., forcing the panel away from the car body by individuals outside the car.

The invention disclosed herein overcomes the difficulties discussed above in that it provides a substantial and positive mechanical support to the door panel. Incorporation of the door panel support action into the door opening sequence locks the panel in place immediately on reaching an open position, thereby minimizing panel oscillation and possibilities for other damage.

Accordingly, therefore, it is an object of this invention to provide a means for stabilizing door panel of a sliding plug door system when in opened position.

It is a further object of this invention to prevent damage to the operator drive of an outside sliding plug door system by resisting external and undesirable forces applied to the panel when in an opened position.

It is an additional object of this invention to minimize passenger hazards due to the panel oscillation when an outside sliding plug door is moved from closed to open.

It is a further object of this invention to provide a sequenced door support for panels of an outside sliding plug door system, wherein a movable door support corrects the panel's outboard sag in an opened position.

SUMMARY OF THE INVENTION

A novel door support system operable when a panel of an outside sliding plug door is in door opened position, somewhat downwardly deflected from its overhead support, adjacent the car side wall. In operation, a rotating arm attached to and extending from a side wall is positioned in time sequence with the panel as it reaches its fully open position. Sequencing locates the operating arm and an attached hook to capture an eyelet on the opening panel at its inside surface. Capture is sequenced and positioned such that travel of the arm intersects the door prior to its reaching a fully opened position, therefore, engagement of the support arm and door proceeds for a predetermined travel of the door to a fully opened position. During arm travel, and after engagement of the arm and panel, trajectory of the arm is such that the panel is pivoted about its upper support to a horizontal position, and firmly attached to the car body.

BRIEF DESCRIPTION OF THE DRAWINGS

FIG. 1 is a partial section of an outside sliding plug door system found in a transit car side wall. In particular, location of the doors in a phantom unplugged position showing the sag or downward deflection of each panel.

FIG. 2 is a section similar to FIG. 1 showing an outside sliding plug door set on a vehicle having a tapered car body, and particularly showing the outward component of panel movement in a door open position.

FIG. 3 is a partial section with the overhead operator of FIGS. 1 and 2, however, with the invention in place. Particularly shown is means of attaching or capturing the door panel.

FIG. 4 is a partial top view of one embodiment of the invention mounted on the tapered frame of the car body of FIG. 2, particularly showing contact between the door panel and support arm prior to and after engagement of the arm and panel.

FIG. 5 is a partial section of one embodiment of the invention particularly showing the support arm in an unengaged position.

FIG. 6 is an additional view of an embodiment of the invention disclosed particularly showing the arm's prime mover and door/arm engagement.

FIG. 7 is a partial exploded detail of the pilot used on the door inner surface and the cooperating jaw or hook of the support arm.

DETAILED DESCRIPTION OF THE INVENTION

Figure 8:
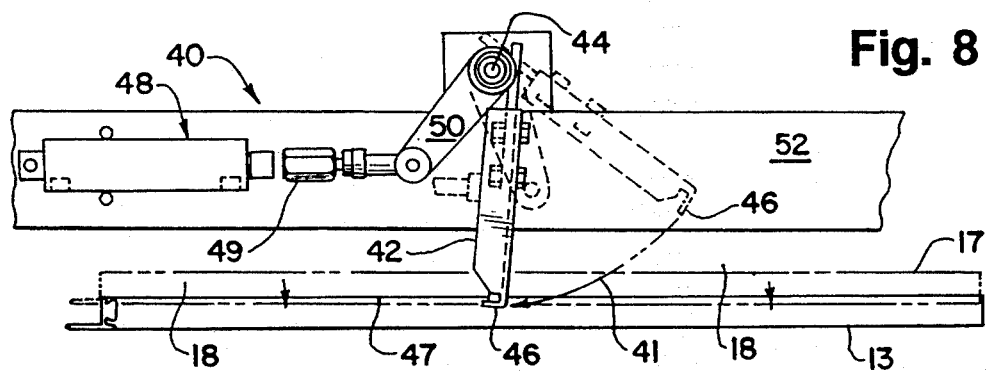
FIG. 8 is a partial top view of an alternate embodiment of the invention particularly showing operation of the support arm, its prime mover, and arm location during and after door panel engagement or capture.

In reference to FIG. 1 there is shown an opening 2 in the side wall 3 of a mass transit vehicle 1 (in partial section). Also shown in FIG. 1 are door panels 7 and 9 movable by power actuator 5 through drive arms 6 from open to closed positions over opening 2. Also shown in FIG. 1 are phantom positions of panels 7 and 9 in an open position, as 11 and 13, respectively. Panels 11 and 13 in their open position occupy a downwardly deflected position characterized by a rotation 12 around door supports 6 to an angularly downward position 14. In the door open position (reference FIG. 2) panel 13 is shown outwardly deflected a distance 15 due to outward forces 16. The importance of these forces and deflections, both downward rotation and outward displacement, will be covered in more detail below.

Although due to the inherent resilience of door supports 6 and the operator assembly 5, the deflections described above are highly undesirable since a small force exerted on, for example, panel 13 at point 16, given the leverage of the entire door panel, can damage either or both the door panel 13 or operator 5 through bending of the door supports 6. In order to overcome this inherent deficiency in the outside sliding plug systems, it is necessary to restrain panel movement when the panel reaches a fully open position.

Accordingly, in FIG. 3, panels 11 and 13 in an open position are shown held by the door stabilization assemblies 20. The stabilizer assembly 20 incorporates an arm 22 having a hooked end 26 engaging an extended eyelet 28 fastened to the internal surface of panels 11 and 13. Arm 22 is attached to structural member 10 or other suitable support of car body 4 as shown in FIG. 4. Door support 20 further incorporates a pivot 24 attached to the arm 22 at the end opposite that of the hook 26. As shown in FIG. 4, the arm 28 moves in a horizontal trajectory 23 rotating around pivot 24. In travel through horizontal trajectory 23, hook 26 contact door panel 13 in an initial position 17 (reference FIG. 4) prior to contact and engagement between the hook 26 and eyelet 28. As shown, contact between the hook 26 and the inner surface 18 of door panel 13 moves panel 13 outwardly with engagement of hook 26 and eyelet 28 to its captured position 18 as shown (reference FIG. 4), thereby insuring positive capture of the panel.

Support arm 22 is rotated through trajectory 23 by drive assembly 20 (reference FIGS. 5 and 6). Stabilizer drive 20 includes a prime mover 25 which may be any number of suitable devices producing rotary motion including but not limited to electric gear motors, pneumatic and/or hydraulic motors, or solenoid devices incorporating rectilinear to rotary movement devices of various types. In operation, prime mover 25 mounted on car body structure 4 has an output shaft coupled to door support pivot 24 by a coupling 27. Pivot 24 extends through a suitable mounting to operate limit switches 29 utilized to integrate operation of the door arm 22 with overall operation of car doors 11 and 13.

In operation, during door movement from closed to open (reference FIGS. 4 and 6), power is applied to the prime mover 25 so as to begin movement of support arm 22 mounted to intersect door panel 13 after panel 13 has reached fully opened position as shown in FIG. 4. A feature of the operation of the door stabilizer lies in the initial contact of hook 26 with inner panel surface 18 at initial position 17. At this point, the panel 13 is moved slightly outward or away from the car body frame 4, insuring proper engagement of hook 26 and eyelet 28. Limit switches 29 are adjusted to operate from cam stop 30 so as to limit travel of arm 22 in its further excursion after engagement of hook 26 and eyelet 28.

Turning now to FIG. 8, there is shown an alternate embodiment 40 of the door stabilizer operating assembly. Assembly 40 includes an actuator assembly 48 shown as a pneumatic or hydraulic cylinder. However, those skilled in the art will readily recognize that any other device producing rectilinear travel can be used as well. Actuator assembly 48 has an output shaft 49 coupled to a multiplying lever 50 fixed to a pivot 44 driving door support arm 42 through a horizontal trajectory 41. As in the first embodiment described above, pivot 44 is fixed to an appropriate frame member 52 of the car body 1 and is similarly synchronized with the door opening system so as to intersect an elongated eyelet 47 affixed to the inner surface 18 of door panel 13 (typically). Also, as described above, hook 46 contacts panel 13 in its opened position 7, or 9, deflecting the panel 13 until contact with the inner surface 18 of panel 13 in its initial position 17 displacing it as shown until engagement between hook 46 and eyelet 47 is achieved (reference FIG. 8).

Figure 9:
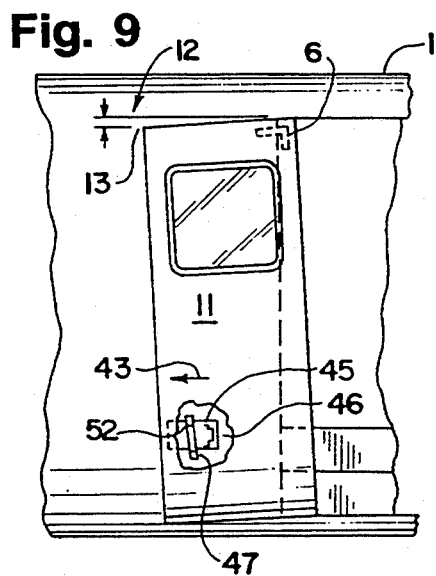
FIG. 9 is a partial diagrammatic view of one panel of an outside sliding plug door system in an opened position, particularly showing downward deflection or sag of the door panel about its upper inside corner prior to capture by the support arm.
Figure 10:
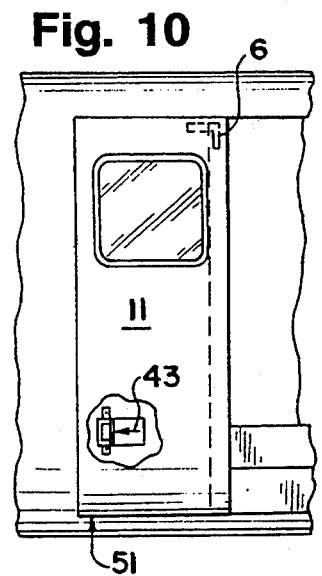
FIG. 10 is essentially the door arrangement of FIG. 9, particularly showing the removal of door deflection by engagement of the door panel and support arm.

FIGS. 9 and 10 disclose a particularly novel and advantageous feature of the invention disclosed. The following will be discussed in terms of the alternate embodiment (reference FIG. 8) although operation and the particular advantages and features apply to the primary embodiment as well.

With particular reference to FIG. 9, there is shown panel 11 in a door open position having downward deflection 13 due to outboard door weight producing a counterclockwise force couple 12. Panel 11 is supported by door actuator support 6 as before. In operation, when the door reaches its fully open position as shown, arm 42 and hook 46 are traveling in the direction 43 as shown.

Turning now to FIG. 10, door panel 11 is shown in essentially a horizontal position, the downward rotation 13 produced by counterclockwise force 12 having been compensated by the engagement of hook 46 and eyelet 47. The required upward force 51 is developed through the contact of hook and eyelet surfaces 45 and 52, respectively, (reference FIG. 7). This counter rotative support force, along with capture of the door panel, provides both support and alignment of the door panels in the open position, thus eliminating the possibility of continued door oscillation on opening or damage to the doors due to external and uncontrolled forces applied to the panel.

Figure 11:
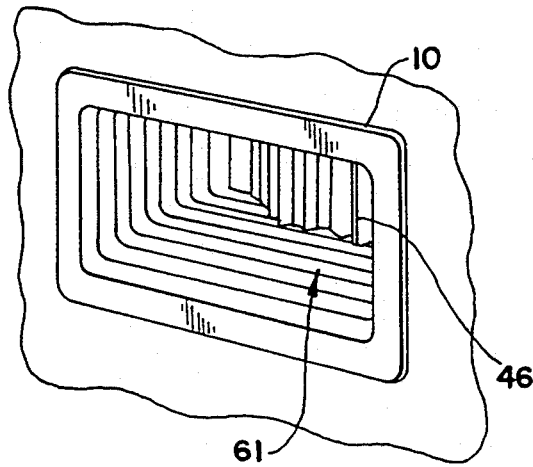
FIG. 11 is a partial depiction of the surface of the car body alone showing the support arm withdrawn into the car body and protected by a flexible bellows.
Figure 12:
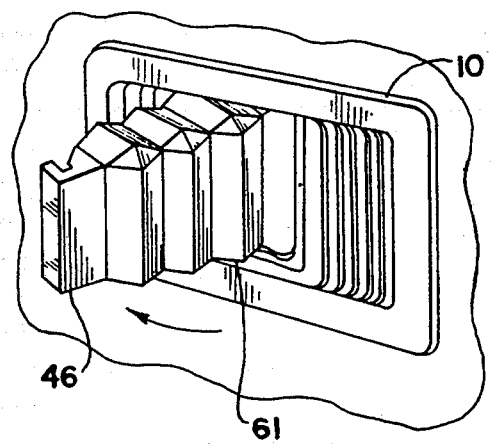
FIG. 12 is an additional figure similar to FIG. 11, however, showing the support arm covered by flexible bellows moving to an actuated position.

FIGS. 11 and 12 show a typical installation of the support arm of the invention showing the location of arm 42 in a door closed or retracted position internal of an aperture 10 in the car body. As shown, bellows assembly 61 surrounds support arm 42. Hook 46 of arm 42 extends through the outer portion of the bellows assembly 61. The assembly 61 and arm 42 are suitably sealed to prevent ambient contamination from entering the car body internal portions. (With reference to FIG. 12, there is shown the support arm 42 and hook 46 in an extended position wherein the bellows extends from its collapsed or internal position to provide continued protection for the car body internals during operation.

It should be noted that the first embodiment of the invention disclosed herein is shown (reference FIGS. 2 and 4) on a transit vehicle having a tapered section ahead of the right hand door. The second embodiment (reference FIG. 8) disclosed below, is shown as used on a vehicle having a frame which parallels the supported panel. Alternate embodiments are included only to complete disclosure of the invention, and do not represent any limitation of its use whatsoever.

Thus, it is apparent that there has been provided in accordance with the invention a stabilizer for outside sliding plug door panels that fully satisfies the objects, aims and advantages set forth above. While the invention has been described in conjunction with first and second embodiments thereof, it is evident that any alternatives, modifications, and variations will be apparent to those skilled in the art of power door equipment for mass transit vehicles in light of the foregoing description. Accordingly, it is intended to embrace all such alternatives, modifications and variations as fall within the spirit and broad scope of the appended claims.

Therefore, I claim:

1. In an outside sliding plug door system of a type utilizing a door panel moving out of and away from an opening in a car side wall, a door panel stabilizer for preventing panel motion in an open position comprising:
   at least one door panel;
   said opening in said car side wall, alternately plugged and unplugged by said panel in moving from closed to open positions, respectively;
   means moving said panel out of said closed position to an open position along said car side wall adjacent said opening; and,
   means stabilizing said panel in an open position comprising:
     an arm on and extending from said car side wall, said arm having first and second ends;
     means mounting said arm first end in said car side wall for motion outward of said side wall and relative to said first end, said motion establishing a trajectory for said arm second end;
     means on said panel and arm second end for connecting said panel and arm second end when engaged;
     means moving said arm, thereby moving said second end through said trajectory when said panel is in an open position, said arm movement actuating said connection and capturing said panel;
     whereby connecting said panel and arm second end holds and stabilizes said panel, preventing panel motion in an opened position.

2. In an outside sliding plug door system of a type utilizing a door panel moving out of and away from an opening in a car side wall, a door panel stabilizer for preventing panel motion in an open position comprising:
   at least one door panel;
   said opening in a car side wall, alternately plugged and unplugged by said panel in moving from closed to open positions, respectively;
   means moving said panel out of said closed position to an open position along said car side wall adjacent said opening; and,
   means stabilizing said panel in an open position comprising:
     an arm on and extending from said car side wall, said arm having first and second ends;
     means mounting said arm first end in said car side wall for pivotal motion around said first end, said motion establishing a horizontal trajectory for said second end;
     a hook on said arm second end;
     elongated eyelet on said panel, said eyelet positioned to intersect said arm and hook trajectory when said panel is in an open position;
     means moving said arm through said trajectory when said panel is in an open position, said arm movement engaging said hook and eyelet;
     whereby engagement of said hook and eyelet captures and stabilizes said panel, preventing panel motion in an opened position.

3. The stabilizer of claim 2 wherein said panel, in an open position, is disposed a first distance from said car side wall, and said hook trajectory exceeds said distance at said intersection, thereby displacing said panel outward on engagement of said hook and eyelet.

4. In combination, an outside sliding plug door panel for use on a mass transit vehicle, said vehicle having an overhead power door operator for moving said panel out of and away from an opening in a side wall of said vehicle, and, a stabilizer for preventing panel motion and correcting panel sag when in an opened position comprising:
   a power door operator, overhead in said side wall opening;
   at least one rectangular panel for plugging and unplugging said opening, said panel having an upper corner on an inner edge, and an inner surface;
   a first position for said panel plugging said opening;
   said operator having attaching means at said panel upper corner for unplugging said opening and moving said panel to a second position away from said opening, said second position pivoting said panel downwardly around said attachment means;
   an elongated eyelet on said panel inner surface adjacent said side wall, said eyelet disposed below said panel attaching means;
   a hook extending from said side wall, said hook mounted for movement in a horizontal arc outside said side wall;
   means rotating said hook through said arc when said panel is in said second position, said arc intersecting said panel and engaging said eyelet, thereby displacing and pivoting said panel angularly upward.

5. The combination of claim 4 wherein said panel second position disposes said panel a fixed distance from said side wall, and said hook extension exceeds said panel to side wall distance;
   wherein said hook displaces said panel outwardly on engaging said eyelet.

* * * * *